US009354436B2

(12) United States Patent
Weiss

(10) Patent No.: US 9,354,436 B2
(45) Date of Patent: May 31, 2016

(54) MICROSCOPE ILLUMINATION METHOD AND MICROSCOPE

(75) Inventor: Albrecht Weiss, Linden (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 832 days.

(21) Appl. No.: 13/558,548

(22) Filed: Jul. 26, 2012

(65) Prior Publication Data

US 2013/0027769 A1 Jan. 31, 2013

(30) Foreign Application Priority Data

Jul. 27, 2011 (DE) .......................... 10 2011 079 942

(51) Int. Cl.
| G02B 21/10 | (2006.01) |
| G02B 21/12 | (2006.01) |
| G02B 21/16 | (2006.01) |
| G02B 21/08 | (2006.01) |

(52) U.S. Cl.
CPC .............. *G02B 21/16* (2013.01); *G02B 21/088* (2013.01)

(58) Field of Classification Search
None
See application file for complete search history.

(56) References Cited

U.S. PATENT DOCUMENTS

| 6,842,281 | B2 * | 1/2005 | Tsurumune et al. .......... 359/368 |
| 7,397,602 | B2 * | 7/2008 | Endo .............................. 359/388 |
| 7,932,504 | B2 * | 4/2011 | Yamada ..................... 250/461.2 |
| 9,007,684 | B2 * | 4/2015 | Hayashi ........................ 359/385 |
| 2003/0202238 | A1 | 10/2003 | Tsurumune et al. |
| 2005/0152028 | A1 * | 7/2005 | Mitzkus ........................ 359/385 |
| 2005/0190366 | A1 * | 9/2005 | Boege et al. .................. 356/417 |
| 2007/0091939 | A1 * | 4/2007 | Yoshikawa et al. ............... 372/2 |
| 2009/0212242 | A1 | 8/2009 | Yamada |
| 2009/0266999 | A1 * | 10/2009 | Krattiger .................... 250/459.1 |
| 2013/0027770 | A1 * | 1/2013 | Ganser et al. ................. 359/388 |
| 2013/0242382 | A1 * | 9/2013 | Komuro ....................... 359/363 |

FOREIGN PATENT DOCUMENTS

| DE | 102004017694 | B3 | 9/2005 |
| DE | 102007022666 | A1 | 1/2008 |
| EP | 1785761 | A1 | 5/2007 |

* cited by examiner

*Primary Examiner* — Derek S Chapel
(74) *Attorney, Agent, or Firm* — Patentbar International, P.C.

(57) ABSTRACT

The present invention relates to a method for illuminating a sample (10) in a microscope (26), the sample (10) being analysed in transmitted light bright field illumination or in incident light fluorescence illumination, wherein a white light LED (4) is used as the light source for the transmitted light bright field illumination, and a shutter (6) is activated at a location in the illumination beam path of the transmitted light bright field illumination during incident light fluorescence illumination and this shutter (6) is deactivated during transmitted light bright field illumination.

16 Claims, 1 Drawing Sheet

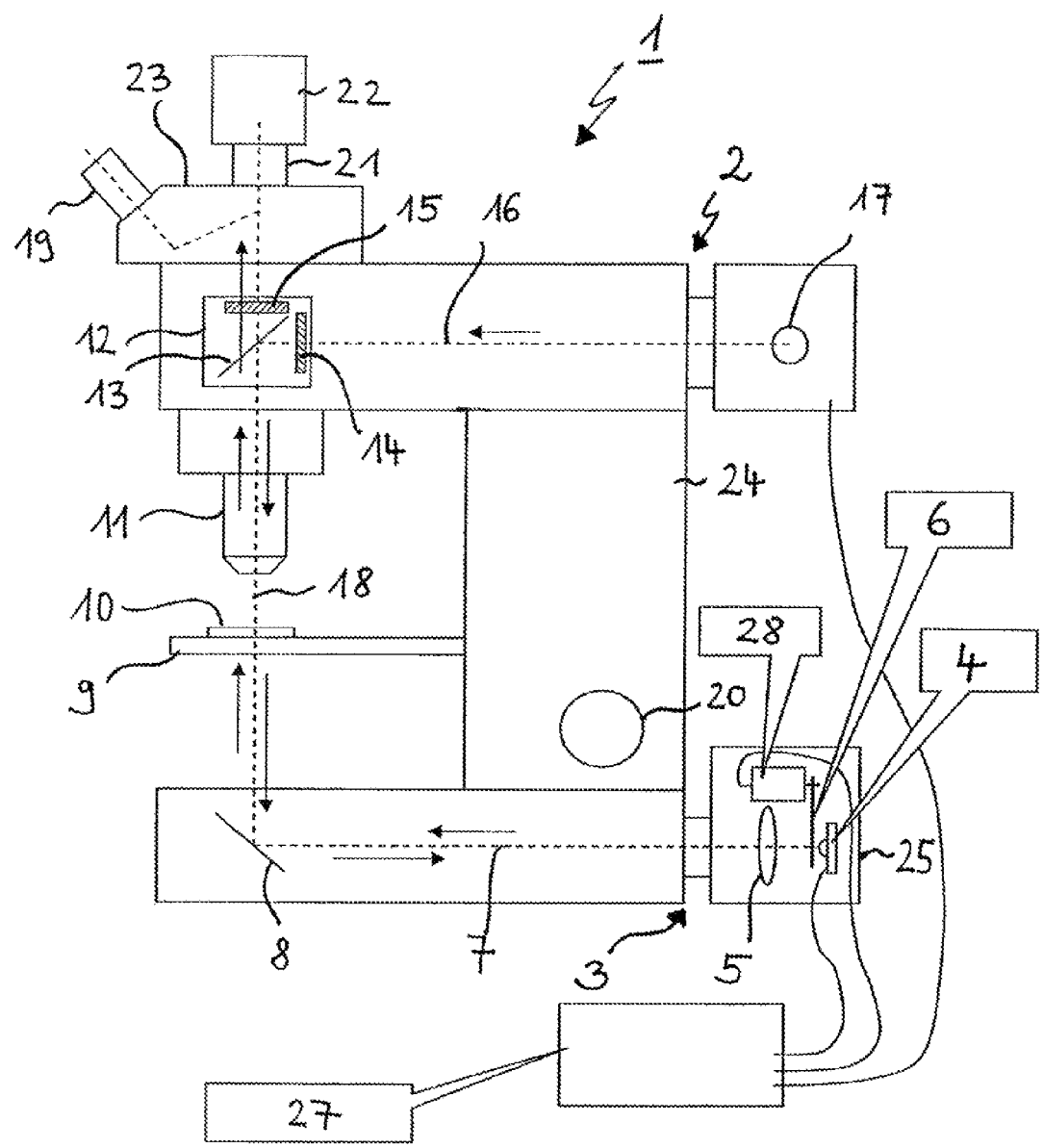

MICROSCOPE ILLUMINATION METHOD AND MICROSCOPE

RELATED APPLICATIONS

This application claims priority to German Patent Application No. 102011079942.7, filed Jul. 27, 2011, which is incorporated herein by reference in its entirety.

FIELD OF THE INVENTION

The present invention relates to a microscope illumination method, to a lighting module for a microscope illumination method of this type, to the use of a lighting module of this type, and to a microscope system for analyzing a sample in transmitted light bright field illumination or incident light fluorescence illumination.

BACKGROUND OF THE INVENTION

In cytodiagnostics and in pathology, stained samples are analyzed by means of a microscope, generally in transmitted light bright field illumination. The color of the microscopically analyzed sample is an important criterion for diagnosis. In other microscopic analyses, for example by contrast methods such as phase contrast or differential interference contrast (DIC), the color of the sample is of less significance. In contrast methods of this type, unstained samples are analyzed, and appear predominantly transparent in transmitted light bright field microscopy. The contrast methods are subsequently used to make phase properties of the sample visible.

Fluorescence microscopy is a further known analysis method. In this context, the sample which is to be analyzed is illuminated by means of an incident light illumination beam path, which passes through what is known as an excitation filter. The excitation light leads to fluorescences in the object which is stained with fluorochromes, the radiated fluorescence light determining the resulting microscope image of the sample. These microscopy methods have been known per se for a relatively long time. For further details, reference is made to the available prior art.

In the last few decades, halogen lamps have been used as the illumination means in the microscope, for example for transmitted light bright field illumination. The light which is emitted by the halogen lamp predominantly corresponds to the continuous spectrum of a black body. Generally, a thermal protection filter is also built into a lighting module comprising a halogen lamp, and greatly attenuates the infra-red range of the emitted radiation. An absorption glass (KG1 having 2 mm thickness) is often used as a thermal protection filter. The continuous spectrum of the resulting illumination makes a reliable color assessment by the user possible.

In the case of illumination with a particular light source, what is known as the color rendering index (CRI) is of importance for assessing colors. This is understood to be a photometric value which can be used to describe the quality of the color rendering of light sources of equal correlated color temperature. Up to a color temperature of 5000 K, the light emitted from a black body of the corresponding color temperature is used as a reference for assessing the rendering quality. Above a color temperature of 5000 K, a daylight-like spectral distribution is used as a reference. For example, for calculating the color rendering of a household filament bulb, which is itself a good approximation to a black body, the spectrum of a black body having a temperature of 2700 K is used. Any light source which perfectly imitates the spectrum of a black body of equal (correlated) color temperature in the range of the visible wavelengths achieves a color rendering index of 100. Halogen lamps, similarly to filament bulbs, can achieve color rendering indices of up to 100.

In microscopy, the halogen lamp is increasingly being replaced with light-emitting diodes (LEDs in the following), which have known advantages. These advantages include greater light radiation at a lower consumption of electrical power and a longer service life. For transmitted light illumination, white LEDs are predominantly used. In a white standard LED, a blue, violet or UV LED is combined with photoluminescent material. Use is generally made of a blue LED, which is combined with a yellow luminescent material. UV LEDs comprising a plurality of different luminescent materials (generally red, green and blue) may also be used. In accordance with the principles of additive color mixing, white light is produced by LEDs of this type. The components manufactured in this manner have good color rendering properties, the color rendering indices being between 70 and 90. However, the white LEDs do not emit a continuous spectrum. White light LEDs which are based on blue LEDs have a strong emission in the blue spectral range (at approximately 450 nm), a minimum in the blue-green (at approximately 500 nm) and a wider emission range up to higher wavelengths, with a maximum at approximately 550 nm, which decreases considerably at approximately 650 nm.

Depending on the type of LED, the ratio of the intensity minimum at 500 nm to the intensity maximum at approximately 450 nm is typically approximately 10-20%. With a discontinuous spectrum of this type as the sample illumination, the color assessment is more difficult, and differs from the empirical values obtained in the case of microscope illumination by means of a halogen lamp.

A specific problem occurs in fluorescence microscopy, which was addressed in the introduction above. If, in the case of the transmitted light bright field microscopy which was discussed above, there is also the possibility of fluorescence microscopy, the inventors found the following effect. A large proportion of the excitation light for the fluorescence excitation passes through the sample and reaches the transmitted light illumination source along the transmitted light illumination axis. If a white light LED is used in this context, blue excitation light leads to excitation of the yellow-green conversion dye in the white LED, in such a way that, in turn, yellow-green light reaches the sample along the transmitted light illumination axis. This is perceived as a disruptive background in the fluorescence image, and can overlap considerably with the actual fluorescence from the sample. This effect occurs even when the white light LED is switched off.

The object of the present invention is therefore to improve the analysis of a sample by means of a microscope in transmitted light bright field illumination or in incident light fluorescence illumination, and to reduce the disruptive radiation in the fluorescence image.

SUMMARY OF THE INVENTION

The present invention relates to a method for illuminating a sample by means of a microscope, the sample being analyzed in transmitted light bright field illumination or in incident light fluorescence illumination, according to claim 1. The invention further relates to a lighting module for a method of this type, to the use of a lighting module of this type, and finally to a suitable microscope system.

Advantageous configurations and advantages of the invention can be found in the respective dependent claims, the following description and the appended drawings.

ADVANTAGES OF THE INVENTION

According to the invention, it is proposed that a white light LED be used as a light source for the transmitted light bright field illumination and a shutter be activated positively at a location in the illumination beam path of the transmitted light bright field illumination means when the incident light fluorescence illumination means is activated and this shutter be deactivated positively when the transmitted light bright field illumination means is activated.

The expression "activating a shutter at a location in the illumination beam path of the transmitted light bright field illumination" is intended to include the shutter being arranged on or introduced into the transmitted light illumination axis in order to fulfill its screening function and thus block the illumination axis completely to the passage of light. Electro-mechanical or electro-optical shutters which are arranged permanently on the transmitted light illumination axis and can be activated and deactivated are also conceivable. "Activating" means interrupting the illumination beam path; "deactivating" means a passage of light which is as unimpeded as possible at the location of the arranged shutter. The shutter is or can be arranged on the transmitted light illumination axis between the sample and the white light LED.

Known shutters include in particular screens which can be pivoted in and out without a screen opening, iris screens which can be switched, in particular electronically, between a position with a screen opening and a position without a screen opening, and finally other forms of electro-optical shutter, for example transmissive displays, which can be switched between a maximum transmissivity mode and a minimum transmissivity mode.

While the use of shutters for rapid activation and deactivation of the light source could be expedient in the case of the previously conventional transmitted light illumination using halogen lamps as the light source, the use of shutters for this purpose has become obsolete ever since LEDs have been used as the light source, since LEDs can be switched very rapidly. In the present invention, a shutter of this type is again integrated into the illumination system in the case of the illumination configuration shown, albeit for a completely different purpose.

According to the invention, said shutter is positively introduced or activated at a location in the illumination beam path of the transmitted light bright field illumination during incident light fluorescence illumination. It should be emphasized that the shutter is introduced or activated at the location in the illumination beam path of the transmitted light bright field illumination even when the light source for the transmitted light illumination, that is to say the white light LED, is switched off.

Since, as mentioned at the outset, a large part of the (blue) excitation light of the fluorescence illumination passes through the sample during fluorescence excitation thereof, and along the transmitted light illumination axis to the white light LED, where it excites the yellow-green conversion dye even when the white light LED is switched off, such that yellow-green light is produced, the shutter which is arranged on the transmitted light illumination axis between the sample and the white light LED can interrupt this mechanism completely and in this way already prevent the excitation of the yellow-green conversion dye in the white light LED effectively. According to the invention, the disruptive background in the fluorescence image, which background is produced as a result of this yellow-green light, can thus be eliminated completely.

It is expedient to activate the shutter at a location directly upstream from the white light LED. "Directly upstream from" is intended to mean that no further objects are located between the shutter and the white light LED, and that the shutter is arranged in the greatest possible expedient proximity to the white light LED, in order to block any beam path emitted from or impinging on this LED. In such a close arrangement of the shutter, the size of the shutter can be reduced to virtually the size of the chip of the white light LED. A small size of a mechanical shutter, that is to say the screen which is to be pivoted in for example, is advantageous, since the shutter can then be moved and operated very rapidly without moving large masses. This then finally makes it possible to activate and deactivate the shutter in a maintenance-free and rapid manner.

The size of the shutter can be selected to be at least the same size as to twice the size of the chip of the white light LED. The shutter is then arranged, according to the size thereof, on the transmitted light illumination axis at an appropriate distance from the white light LED, such that the shutter completely blocks or screens the illumination beam path of the transmitted light bright field illumination. In an arrangement of this type, it is then also ensured that propagating excitation light from the incident light fluorescence illumination cannot continue forwards along the transmitted light illumination axis to the white light LED of the transmitted light bright field illumination.

It is expedient for the shutter to be activated or deactivated automatically by means of a mechanical positive coupling. Upon activation thereof, the incident light fluorescence illumination means is then mechanically operatively connected to the shutter, which is then activated automatically. Conversely, when the transmitted light bright field illumination means is activated, this shutter is deactivated automatically by a corresponding mechanical positive coupling.

In general, the positive deactivation of the shutter can alternatively occur when the incident light fluorescence illumination means is switched off.

It is expedient to operate the shutter by means of a motor which activates and deactivates the shutter positively. For this purpose, a kind of ladle or paddle for example can be fastened to the motor shaft. The motor then produces a small rotational movement between the two "shutter activated" and "shutter deactivated" end positions. As described below in connection with a microscope system according to the invention, control via a control device is particularly advantageous.

The invention further relates to a lighting module for the illumination of a sample in a microscope, in which the sample can be analyzed both in transmitted light bright field illumination and in incident light fluorescence illumination. The lighting module comprises a white light LED as the light source for the transmitted light bright field illumination, and a shutter, the shutter being arranged such that it can be activated and deactivated at a location in the illumination beam path of the transmitted light bright field illumination. As is conventional, the lighting module can be connected to the microscope so as to couple in the illumination beam path of the transmitted light bright field illumination.

With regard to expedient configurations of the lighting module, reference is made to the statements made above in connection with the method according to the invention. Further configurations are also described in connection with the microscope according to the invention which is to be described below. Reference is explicitly made to the fact that all of the configurations of a particular aspect of the present invention are also intended to apply to each of the other aspects.

The lighting module according to the invention can be used in particular for the above-described method according to the invention.

Finally, the invention relates to a microscope for analyzing a sample in transmitted light bright field illumination or in incident light fluorescence illumination, it being possible to provide the two options, at least alternately, by means of this microscope simply by switching the corresponding illumination units. For this purpose the microscope comprises a transmission light bright field illumination means and an incident light fluorescence illumination means. A white light LED is provided as the light source for the transmitted light bright field illumination means. A shutter can also be activated positively at a location in the illumination beam path of the transmitted light bright field illumination during analysis of the sample in incident light fluorescence illumination, while the shutter can be deactivated positively during analysis of the sample in transmitted light bright field illumination.

With regard to the advantages and possible configurations of a microscope of this type, reference is made in general to the above statements. In particular it is advantageous to provide a lighting module in which at least parts of the transmitted light illumination means are accommodated. A lighting module of this type expediently comprises the white light LED and the shutter. Illumination optics for collimating the transmitted light illumination beam path are optionally also accommodated in the lighting module. In a conventional manner, the lighting module can be connected to the microscope for coupling in the transmitted light illumination beam path.

As set out above, it is expedient to operate the shutter via a motor, which can expediently also be accommodated in the lighting module.

Implementation of the method according to the invention in a microscope system of this type by means of a control device is particularly advantageous. For this purpose the control device is connected on the one hand to the incident light fluorescence illumination means and on the other hand to the transmitted light bright field illumination means and in particular to the lighting module. In this way, the control device can register the activation of the incident light fluorescence illumination means and thereupon activate the shutter, which in particular is motor-operated. The control device can then deactivate the in particular motor-operated shutter upon deactivation of the incident light fluorescence illumination means or alternatively only upon activation of the white light LED of the transmitted light bright field illumination means. The described control mechanism can obviously also be provided in the case of shutters which are not motor-operated, such as the above-mentioned electro-optical shutters.

It goes without saying that the above-mentioned features and those which are to be described in the following can be used not only in the respectively stated combinations, but also in other combinations or in isolation, without departing from the scope of the present invention.

The invention is shown schematically in the drawings by way of an embodiment, and is described in detail in the following with reference to the drawings.

BRIEF DESCRIPTION OF THE DRAWINGS

FIG. 1 shows a configuration of a microscope according to the invention.

DETAILED DESCRIPTION OF THE PREFERRED EMBODIMENTS

The sole FIG. 1 is a schematic view of a configuration of a microscope 1 according to the invention along with the main components thereof, the microscope system 1 being designed for analysis of a sample 10 in incident light fluorescence illumination and in transmitted light bright field illumination, the two types of illumination usually being alternated.

The incident light fluorescence illumination means 2 comprises the following components: an incident light illumination light source 17, for example a mercury vapour lamp, and a fluorescence filter block 12, which are arranged on the incident light illumination axis 16. The fluorescence filter block 12 comprises an excitation filter 14, which is followed, in the propagation direction of the incident light illumination light, by a beam splitter 13. The excitation filter 14 is used to select one or more wavelength ranges which are suitable for exciting fluorescences in the sample 10. The beam splitter 13 deflects the excitation light which is transmitted through the filter 14 towards the sample 10. A blocking filter 15 is further provided in the fluorescence filter block 12. The blocking filter 15 ensures that only the fluorescence light which is emitted by the sample reaches the viewer, and thus blocks the excitation light.

The transmitted light bright field illumination means 3 comprises the following components: a white light LED 4 as a light source, followed by illumination optics 5 for collimation of the illumination light and finally a deflection mirror 8 arranged underneath the sample 10. A shutter 6 can also be arranged on the transmitted light illumination axis 7, the shutter 6 being arranged between the white light LED 4 and the sample 10, in particular between the white light LED and the deflection mirror 8, but particularly advantageously directly upstream from the white light LED, that is to say in this case between the white light LED 4 and the illumination optics 5. In the case shown, the shutter is located directly upstream from the white light LED 4 on the transmitted light illumination axis 7 and thus completely screens light coming from the white light LED. In the embodiment according to FIG. 1, some components of the transmitted light bright field illumination means 3 are also accommodated in a lighting module 25. These components include in particular the white light LED and shutter 6. In the case of a motor-operated shutter, it is expedient also to accommodate the motor 28 in the lighting module 25. In the case shown, the illumination optics 5 is also accommodated in the lighting module. The lighting module 25 can be connected to the microscope 1 via a suitably shaped interface for coupling the transmitted light illumination beam path into the microscope 1.

Further known conventional components of a microscope 1 include the microscope table 9 along with the sample 10 which is arranged thereon, the microscope table 9 being adjustable in the z direction, that is to say parallel to the optical axis 18, for focusing purposes, by means of a focusing knob 20 which is provided on the stand 24 of the microscope. A microscope objective lens 11, the microscope lens tube 23 and an eye-piece 19 are further shown, and finally a camera port 21 with a camera 22 connected. The objective lens 11 may be a component of an objective lens turntable, which carries a plurality of different objective lenses. The lens tube 23 comprises, in the interior thereof, deflection prisms (not shown for clarity) which serve to deflect the beam paths of the microscope to the viewer and to the camera 22.

The incident light illumination beam path which is produced by the incident light fluorescence illumination means 2 has an axis 16 and propagates along the arrows which are shown in FIG. 1. Said path initially passes through the excitation filter 14, so as to be deflected towards the sample 10 by the beam splitter 13. Fluorescences are excited in the sample, but the majority of the excitation light actually passes through the sample 10 and propagates along the transmitted light illumination axis 7 into the transmitted light bright field illumination means 3. Via the deflection mirror 8, the excitation light reaches the lighting module 25 along the transmitted light illumination axis 7, that is to say in particular reaches the white light LED 4 via the illumination optics 5.

In particular in the case of filter systems 12 for blue excitation (for example for fluorochromes such as FITC or GFP) this blue excitation light is extremely well suited for exciting the conversion dye in the white light LED, causing said dye to emit light in the yellow-green range. This light (again shown by arrows) propagates along the transmitted light illumination axis 7 towards the deflection mirror 8, from which it continues to the sample 10. The yellow-green light continues from the sample 10, via the objective lens 11, to the fluorescence filter block 12, and can pass through the blocking filter 15 and thus reach the eye-piece 19 or the camera 22. Without counter measures, this effect becomes noticeable in a highly disruptive manner as a yellow-green background in the fluorescence image.

Owing to the shutter 6 which can be activated, it is possible to eliminate the disruptive yellow-green background in the fluorescence image if the shutter 6 is activated during fluorescence light illumination in order to screen the white light LED 4 completely, that is to say protect it from radiation with blue excitation light.

For this purpose, in the case of fluorescence illumination, the shutter 6 is arranged on the transmitted light illumination axis 7. Ideally, a control device 27 is provided for control and is operatively connected to the fluorescence incident light illumination means 2 and generally to the transmitted light bright field illumination means 3, especially to the lighting module 25. As a result, activation of the light source 17 of the incident light fluorescence illumination means 2 can be detected. Thereupon the control device 27 actuates the motor 28, which operates the shutter 6. The motor 28 is supplied with a signal which is used to position the shutter 6 on the transmitted light illumination axis 7. In this way, the white light LED 4 is protected from radiation with blue excitation light which passes through the sample 10. On the other hand, propagation of the transmitted light beam path along the transmitted light illumination axis downstream of the shutter 6 is obviously no longer possible, even when the white light LED 4 is activated.

The control device 27 is further connected to the lighting module 25, in particular the white light LED 4 or a control system provided specially for this white light LED 4. As a result, activation of the white light LED can be detected. For example, when the white light LED 4 is activated, the shutter 6 can be removed from the transmitted light illumination axis 7 via a corresponding signal to the motor 28 in order to free the transmitted light illumination beam path. In another option, this can take place only when both the white light LED 4 is switched on and the light source 17 is switched off. If the shutter 6 is removed from the transmitted light illumination beam axis 7, the transmitted light illumination beam path can propagate via the illumination optics 5 and the deflection mirror 8 to the sample 10.

When the shutter 6 is arranged directly upstream from the white light LED 4, as shown in FIG. 1, it is possible to limit the size of the shutter, that is to say for example of a ladle-shaped screen, to the size or twice the size of, in particular at least to 1.1 to 1.5 times the size of the light-emitting chip on the white light LED 4. This thus allows very small effective shutter faces, which consequently can easily be operated by a motor 28. Alternatively, instead of the arrangement of shutter 6 and motor 28, an electro-optical transmissive display can be provided, which is actuated for example directly by the control device 27. On this display, a corresponding opening for the unimpeded passage of the transmitted light illumination beam path can be freed in the "shutter deactivated" function, while this region is made opaque in the "shutter activated" function.

LIST OF REFERENCE NUMERALS

1 Microscope
2 Incident light fluorescence illumination means
3 Transmitted light bright field illumination means
4 White light LED
5 Illumination optics
6 Shutter
7 Transmitted light illumination axis
8 Deflection mirror
9 Microscope table
10 Sample
11 Objective lens
12 Fluorescence filter block
13 Beam splitter
14 Excitation filter
15 Blocking filter
16 Incident light illumination axis
17 Incident light illumination light source
18 Optical axis
19 Eye-piece
20 Focusing knob
21 Camera port
22 Camera
23 Lens tube
24 Stand
25 Lighting module
27 Control device
28 Motor

What is claimed is:

1. A method for illuminating a sample in a microscope, the method comprising:
    illuminating the sample by a transmitted light bright field illumination from a white light LED source, or an incident light fluorescence illumination transmitted from an incident light source;
    providing a shutter positioned in a transmitted light bright field illumination beam path coming from the white light LED source;
    positively activating a shutter in the path of the transmitted light bright field illumination when the white light LED source is switched off and the incident light source is activated, thereby preventing light of the incident light source reaching the white light LED; and
    positively deactivating the shutter upon activating the white light LED source, wherein activating the shutter introduces the shutter into the path of the transmitted light bright field illumination, and deactivating the shutter removes the shutter from the path.

2. The method according to claim 1, comprising activating the shutter at a location directly upstream from the white light LED.

3. The method according to claim 2, comprising automatically activating or deactivating the shutter by means of a mechanical positive coupling.

4. The method according to claim 2, comprising automatically activating or deactivating the shutter by operating a motor.

5. The method according to claim 1, comprising automatically activating or deactivating the shutter by means of a mechanical positive coupling.

6. The method according to claim 1, comprising automatically activating or deactivating the shutter by operating a motor.

7. A lighting module for illuminating a sample in a microscope, the lighting module comprising: an incident light source for transmitting incident light fluorescence illumination; a white light LED for transmitting light bright field illumination; and a shutter being positively activated in a path of the transmitted light bright field illumination when the white light LED source is switched off and the incident light source is activated, thereby preventing light of the incident light source reaching the white light LED, and the shutter being deactivated to be removed from the path of the transmitting light bright field illumination upon activation of the white light LED source.

8. The lighting module according to claim 7, wherein the shutter is arranged directly upstream from the white light LED.

9. The lighting module according to claim 8 further comprising a motor for operating the shutter in order to activate and deactivate the shutter positively.

10. A method of using a lighting module for illuminating a sample in a microscope, the method comprising:
providing the lighting module comprising a white light LED source for transmitting light bright field illumination and a shutter positioned in a transmitted light bright field illumination beam path coming from the white light LED source, the shutter being activated and deactivated at a location in an illumination beam path of the transmitted light bright field illumination;
illuminating the sample by the transmitted light bright field illumination or, alternatingly, by incident light fluorescence illumination from an incident source, wherein the shutter is positively activated into the beam path of the transmitted light bright field illumination when the white light LED source is switched off, thereby preventing light of the incident light source reaching the white light LED
and upon activation of the incident light fluorescence illumination the shutter is positively deactivated upon activation of the white light LED source; and
analyzing, by the lighting module, the transmitted light bright field illumination or the incident light fluorescence illumination.

11. The method of using a lighting module for illuminating a sample in a microscope according to claim 10, wherein the shutter is arranged directly upstream from the white light LED.

12. The method of using a lighting module for illuminating a sample in a microscope according to claim 10, further providing a motor for operating the shutter in order to activate and deactivate the shutter positively.

13. A microscope for analyzing a sample in transmitted light bright field illumination or in incident light fluorescence illumination, the microscope comprising:
a white light LED source generating the transmitted light bright field illumination;
an incident light source generating the incident light fluorescence illumination; and
a shutter arranged along a beam path of the transmitted light bright field illumination, the shutter being activated to block the path of the transmitted light bright field illumination when the white light LED source is switched off and the incident light source is activated in a configuration to prevent light of the incident light source reaching the white light LED, and the shutter being deactivated to be removed from the path of the transmitted light bright field illumination upon activation of the white light LED source.

14. The microscope system according to claim 13, further comprising a lighting module comprising the white light LED and the shutter, the lighting module being coupled to the microscope for coupling the illumination beam path of the transmitted light bright field illumination into said microscope.

15. The microscope system according to claim 14, further comprising a control device operatively connected to a lighting module of the white light LED source and to the incident light source, wherein the shutter is positively deactivated upon operation of the white light LED source, and the shutter is positively activated upon operation of the incident light source.

16. The microscope system according to claim 15, wherein the control device is operatively connected to a motor for operating the shutter, the motor being accommodated in the lighting module in order to activate and deactivate the shutter positively.

* * * * *